US008597807B2

(12) United States Patent
Lee et al.

(10) Patent No.: US 8,597,807 B2
(45) Date of Patent: Dec. 3, 2013

(54) SECONDARY BATTERY INCLUDING A THERMALLY INSULATING SHEET HAVING A RECESS FOR RECEIVING A THERMAL FUSE

(75) Inventors: Sangjoo Lee, Suwon-si (KR); Heuisang Yoon, Suwon-si (KR); Woonseong Baek, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 442 days.

(21) Appl. No.: 12/805,137

(22) Filed: Jul. 14, 2010

(65) Prior Publication Data
US 2011/0039133 A1 Feb. 17, 2011

Related U.S. Application Data

(60) Provisional application No. 61/272,046, filed on Aug. 11, 2009.

(51) Int. Cl.
*H01M 2/04* (2006.01)
*H01M 2/30* (2006.01)
*H01M 10/48* (2006.01)
*H01M 14/00* (2006.01)

(52) U.S. Cl.
USPC .................. 429/7; 429/92; 429/176; 429/178

(58) Field of Classification Search
USPC ......... 429/7, 62, 164, 185, 184, 120, 56, 175, 429/92, 176, 178
See application file for complete search history.

(56) References Cited

U.S. PATENT DOCUMENTS

| | | | |
|---|---|---|---|
| 6,861,821 B2 | 3/2005 | Masumoto et al. | |
| 7,248,021 B2 | 7/2007 | Kozu et al. | |
| 2005/0112456 A1 | 5/2005 | Kozu et al. | |
| 2005/0266279 A1* | 12/2005 | Kim | 429/7 |
| 2006/0078787 A1* | 4/2006 | Sato et al. | 429/62 |
| 2008/0280200 A1 | 11/2008 | Takahashi et al. | |
| 2009/0038145 A1 | 2/2009 | Kozu et al. | |
| 2009/0130550 A1 | 5/2009 | Kim | |

FOREIGN PATENT DOCUMENTS

| | | |
|---|---|---|
| CN | 1705155 A | 12/2005 |
| CN | 2009-96530 | 12/2007 |
| JP | 2003-132860 | 5/2003 |

(Continued)

OTHER PUBLICATIONS

"3M VHB Tapes Technical Data", 3M Industrial Adhesives and Tapes Division, St. Paul, MN, Apr. 2012. Retrieved online on Sep. 5, 2012 from: http://multimedia.3m.com/mws/mediawebserver?mwsId=66666UF6EVsSyXTtnXfcoxfyEVtQEVs6EVs6EVs6E666666--&fn=70070940609.pdf.*

*Primary Examiner* — Kenneth Douyette
(74) *Attorney, Agent, or Firm* — Lee & Morse, P.C.

(57) ABSTRACT

A battery includes an external terminal, a thermal fuse, a bare cell, an electrode assembly disposed within the bare cell and electrically coupled to the external terminal via the thermal fuse, such that the thermal fuse electrically disconnects the electrode assembly from the external terminal when a temperature of the battery reaches a predetermined value, a top cover, a protective circuit module within the top cover and on the bare cell, and a thermally insulating top sheet disposed on the thermal fuse, between the thermal fuse and the protective circuit module, the top sheet having a recess configured to receive the thermal fuse, such that the top sheet covers the top surface of the thermal fuse.

20 Claims, 4 Drawing Sheets

(56) References Cited

FOREIGN PATENT DOCUMENTS

| | | |
|---|---|---|
| JP | 2003-308815 A | 10/2003 |
| JP | 2008-117621 A | 5/2008 |
| KR | 10 2005-0110504 A | 11/2005 |
| KR | 10-2005-0110504 A | 11/2005 |
| KR | 10-2007-0008256 A | 1/2007 |
| KR | 10 2007-0008256 A | 1/2007 |
| KR | 10-2007-0071249 A | 7/2007 |
| KR | 10-2009-0050179 A | 5/2009 |

* cited by examiner

SECONDARY BATTERY INCLUDING A THERMALLY INSULATING SHEET HAVING A RECESS FOR RECEIVING A THERMAL FUSE

CROSS-REFERENCE TO RELATED APPLICATION

This application claims priority to U.S. Provisional Application No. 61/272,046, filed in the U.S. Patent and Trademark Office on Aug. 11, 2009, and entitled "SECONDARY BATTERY," which is incorporated by reference herein in its entirety and for all purposes.

BACKGROUND OF THE INVENTION

1. Field of the Invention

Embodiments relate to a secondary battery.

2. Description of the Related Art

A secondary battery may be overcharged or overdischarged during charging and discharging. The overcharge and overdischarge may cause gas to be generated from electrolyte and/or may cause excessive heat, resulting in inferior performance and/or damage to the battery. Thus, the secondary battery may include a protective circuit module (PCM) in order to prevent the overcharge and/or overdischarge. The PCM may act to stop the charging or discharging when overcharge and/or overdischarge of the secondary battery is detected.

The secondary battery may also include a secondary protective device, e.g., a fuse, to prevent the secondary battery from being damaged due to heat. The secondary protective device may respond to heat from a bare cell of the secondary battery, and may interrupt electric current of the bare cell when temperature of the bare cell exceeds a predetermined temperature or when excessive current flows through the bare cell.

SUMMARY OF THE INVENTION

Embodiments are directed to a secondary battery, which substantially overcomes one or more problems due to the limitations and disadvantages of the related art.

It is therefore a feature of an embodiment to provide a secondary battery in which a thermal fuse is protected against contact with hot resin during manufacturing.

It is therefore another feature of an embodiment to provide a method of manufacturing a secondary battery that includes forming a top cover using a hot melt process and blocking hot resin from contacting a thermal fuse.

At least one of the above and other features and advantages may be realized by providing a battery, including an external terminal, a thermal fuse, a bare cell, an electrode assembly disposed within the bare cell and electrically coupled to the external terminal via the thermal fuse, such that the thermal fuse electrically disconnects the electrode assembly from the external terminal when a temperature of the battery reaches a predetermined value, a top cover, a protective circuit module within the top cover and on the bare cell, and a thermally insulating top sheet disposed on the thermal fuse, between the thermal fuse and the protective circuit module, the top sheet having a recess configured to receive the thermal fuse, such that the top sheet covers the top surface of the thermal fuse.

The top cover may include a mold material, and the mold material may be flowable during manufacture of the battery cover so as to conform to the protective circuit module.

The recess in the top sheet may be configured to cover at least parts of side surfaces of the thermal fuse.

The thermal fuse may have a main body, a first lead extending from a first end of the main body, and a second lead extending from a second end of the main body, and the recess may have a channel shape configured to receive the main body, the first lead, and the second lead.

The thermal fuse may have a main body, a first lead extending from a first end of the main body, and a second lead extending from a second end of the main body, the recess may have a box shape configured to receive the main body, and the first lead and the second lead may extend along the top sheet beyond the periphery of the recess.

The top sheet may include at least three layers, including a center layer providing a first degree of thermal insulation, and a top layer and a bottom layer sandwiching the center layer, the top and bottom layers having a second degree of thermal insulation less than that of the center layer, and having a heat tolerance that is greater than that of the center layer.

The recess may not extend completely through the top layer, such that at least a partial thickness of the top layer covers the top surface of the thermal fuse.

The recess may not extend completely through the center layer, such that at least a partial thickness of the center layer covers the top surface of the thermal fuse.

The recess may extend completely through the bottom layer.

The thermal fuse may have a main body, a first lead extending from a first end of the main body, and a second lead extending from a second end of the main body, the recess may be formed at least in part by a box shaped opening in the bottom layer, the box shaped opening configured to receive the main body, and the first lead and the second lead may extend along the top sheet beyond the periphery of the recess.

Sides of the main body may be at least partially overlapped in a vertical direction by sidewalls of the recess.

The thermal fuse may have a main body, a first lead extending from a first end of the main body, and a second lead extending from a second end of the main body, the recess may have a partial channel shape configured to receive the main body and the first lead, the second lead may extend beyond the periphery of the recess, and the first lead may be electrically coupled to an electrode terminal of the electrode assembly, the partial channel shape covering the first lead and the electrode terminal.

The battery may further include a thermally insulating bottom sheet disposed under the thermal fuse, between the thermal fuse and the bare cell. The top sheet and bottom sheet together may cover a top surface, at least a portion of a bottom surface, and side surfaces of the thermal fuse, such that the thermal fuse is thermally insulated from a mold material used to form the top cover.

The thermal fuse may have a main body, a first lead extending from a first end of the main body, and a second lead extending from a second end of the main body, the bottom sheet may have an opening therethrough that corresponds to the main body, and the main body may be in thermal communication with the bare cell via the opening.

The bottom sheet may electrically isolate the thermal fuse from an adjacent surface of the bare cell, and a thermally conductive material may be disposed in the opening so as to provide a thermal coupling between the thermal fuse and the adjacent surface.

At least one of the above and other features and advantages may also be realized by providing a battery, including an external terminal, a thermal fuse, a bare cell, an electrode assembly disposed within the bare cell and electrically coupled to the external terminal via the thermal fuse, such that the thermal fuse electrically disconnects the electrode assembly from the external terminal when a temperature of the battery reaches a predetermined value, a top cover, a protective circuit module within the top cover and on the bare cell, and a thermally insulating top sheet disposed on the thermal fuse, between the thermal fuse and the protective circuit module. The top sheet may cover a top surface of the thermal fuse, such that the top surface of the thermal fuse is thermally insulated, and the top sheet may include at least three layers, including a center layer providing a first degree of thermal insulation, and a top layer and a bottom layer sandwiching the center layer, the top and bottom layers having a second degree of thermal insulation less than that of the center layer, and having a heat tolerance that is greater than that of the center layer.

The thermal fuse may have a main body, a first lead extending from a first end of the main body, and a second lead extending from a second end of the main body, the top sheet may have a recess configured to receive the main body, the recess may not extend completely through the top layer, such that at least a partial thickness of the top layer covers a top surface of the main body, the recess may be formed at least in part by a box shaped opening that penetrates the bottom layer, the box shaped opening configured to receive the main body, sides of the main body being at least partially overlapped in a vertical direction by sidewalls of the recess, and the first lead and the second lead may extend along the top sheet beyond the periphery of the recess.

The top cover may include a mold material, and the mold material may be flowable during manufacture of the battery cover so as to conform to the protective circuit module.

At least one of the above and other features and advantages may also be realized by providing a battery, including an external terminal, a thermal fuse, a bare cell, an electrode assembly disposed within the bare cell and electrically coupled to the external terminal via the thermal fuse, such that the thermal fuse electrically disconnects the electrode assembly from the external terminal when a temperature of the battery reaches a predetermined value, a top cover, a protective circuit module within the top cover and on the bare cell, a thermally insulating top sheet disposed on the thermal fuse, between the thermal fuse and the protective circuit module, and a thermally insulating bottom sheet disposed under the thermal fuse, between the thermal fuse and the bare cell. The top sheet and bottom sheet together may cover a top surface, at least a portion of a bottom surface, and side surfaces of the thermal fuse, such that the thermal fuse is thermally insulated from the mold material of the battery cover.

The top cover may include a mold material, and the mold material may be flowable during manufacture of the battery cover so as to conform to the protective circuit module.

BRIEF DESCRIPTION OF THE DRAWINGS

The above and other features and advantages will become more apparent to those skilled in the art by describing in detail example embodiments with reference to the attached drawings, in which.

DETAILED DESCRIPTION OF THE INVENTION

Figure 1:
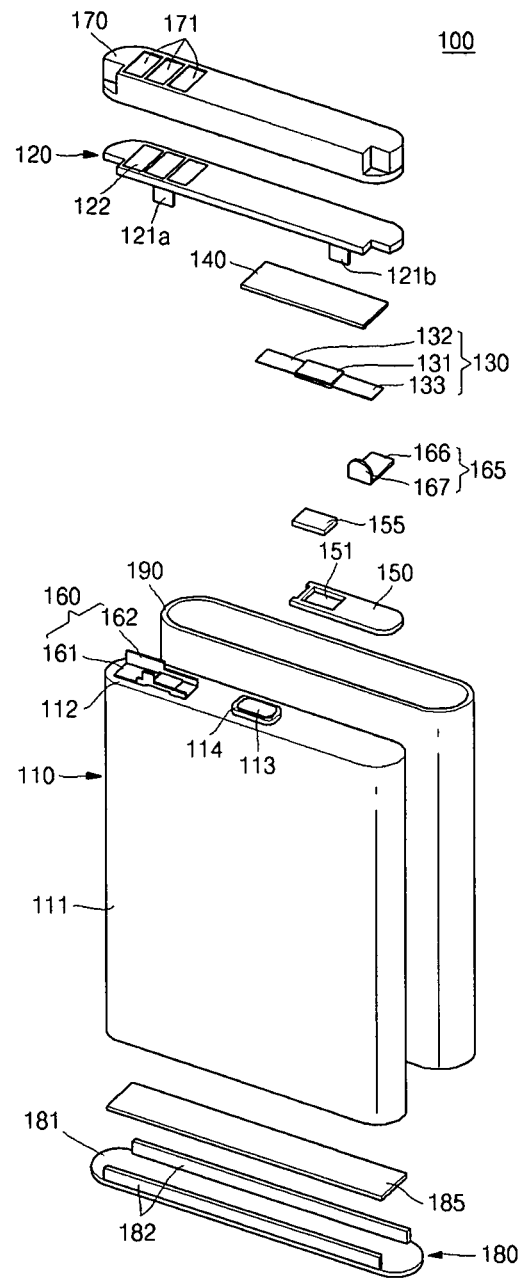
FIG. 1 illustrates an exploded perspective view of a secondary battery according to a first embodiment.

Example embodiments will now be described more fully hereinafter with reference to the accompanying drawings; however, they may be embodied in different forms and should not be construed as being limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In a secondary battery according to embodiments, a thermal fuse may be protected from contact with a mold material or resin, e.g., an organic thermoplastic or other material that is flowable during manufacture of the battery and may be used in a hot melt process to form a top cover of the battery, so as to prevent the thermal fuse from being damaged during manufacture. Thus, heat transferred from hot resin to the thermal fuse during manufacture of the battery may be minimized. Accordingly, it may be possible to reduce or completely prevent heat damage to the fuse during manufacture of the battery, e.g., during a hot melt process used to form a top cover that conforms to underlying battery features.

A secondary battery according to a first embodiment will now be described.

Figure 2:
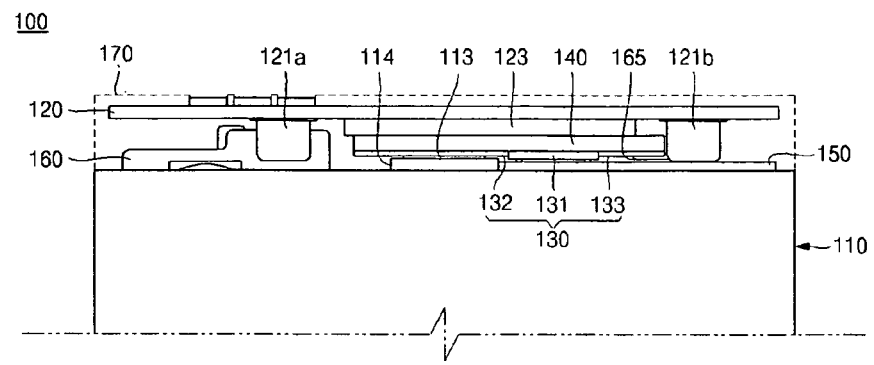
FIG. 2 illustrates a partial front view of an assembly of the secondary battery of FIG. 1.
Figure 3:
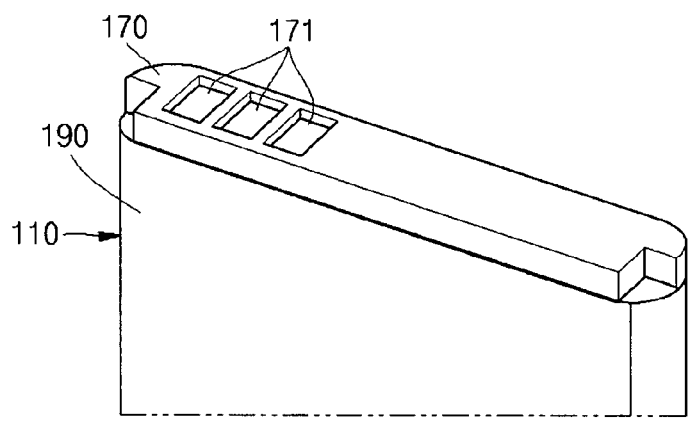
FIG. 3 illustrates a partial perspective view of the assembly of the secondary battery of FIG. 1.

FIG. 1 illustrates an exploded perspective view of a secondary battery 100 according to the first embodiment, FIG. 2 illustrates a partial front view of an assembly of the secondary battery 100 of FIG. 1, and FIG. 3 illustrates a partial perspective view of the assembly of the secondary battery 100 of FIG. 1.

Referring to FIGS. 1 to 3, the secondary battery 100 according to the first embodiment may include a bare cell 110, a protective circuit module (PCM) 120, a fuse 130, a top tape 140, a bottom tape 150, and a top cover 170. The top cover 170 may be formed by, e.g., injecting and molding a hot resin using a hot melt process. During the formation of the top cover 170, the hot resin may be injected into a space around the fuse 130 during the hot melt process of forming the top cover 170. The secondary battery 100 may further include a first lead plate 160, a second lead plate 165, a bottom cover 180, and a label 190.

In the secondary battery 100, the fuse 130 may be a thermal fuse. The fuse 130 may interrupt current flow within the secondary battery 100 when the temperature of the secondary battery 100 reaches a predetermined value. For example, if temperature of the secondary battery 100 becomes elevated and reaches the predetermined value, whether as a result of excessive ambient temperature or internal heat generation within the battery, the fuse 130 may open to interrupt current flow. The interruption of current flow may be non-reversible, i.e., the fuse may be a one-time use device that opens upon reaching the predetermined temperature value and must be replaced thereafter in order to restore current flow.

The thermal fuse 130 may be disposed between the bare cell 110 and the PCM 120. In the secondary battery 100, the top tape 140 and the bottom tape 150 may be disposed on the top and the bottom of the fuse 130, respectively. As shown in FIG. 2, the top tape 140 may entirely fill a space defined between the fuse 130 and the PCM 120. Thus, the top tape 140 may prevent the fuse 130 from contacting hot melt resin, and may reduce or eliminate the transfer of heat from the hot melt resin to the fuse 130 during hot melt process.

The bare cell 110 may include a can 111, a cap plate 112, an electrode terminal 113, and a gasket 114. In general, the bare cell 110 may have various shapes. The bare cell 110 may be, e.g., a lithium secondary battery.

The can 111 may have a hollow inner space, a closed bottom, and an open top. The can 111 may house an electrode assembly having a positive electrode plate, a separator, and a negative electrode plate (not shown).

The cap plate 112 may be a plate made of electrically conductive metal. The cap plate 112 may cover the entire open top of the can 111. The cap plate 112 may be connected to the positive electrode plate or the negative electrode plate to serve as a negative electrode or a positive electrode, respectively. Hereinafter, a case when the cap plate 112 serves as a positive electrode will be described.

The electrode terminal 113 may be made of electrically conductive metal. The electrode terminal 113 may have an approximately cylindrical shape. The electrode terminal 113 may be electrically insulated from the cap plate 112 and may penetrate from the bottom to the top of the cap plate 112, e.g., in the center thereof. The electrode terminal 113 may project above the cap plate 112. The electrode terminal 113 may be connected to the positive electrode plate or the negative electrode plate to serve as a positive electrode or a negative electrode, respectively. Hereinafter, a case when the electrode terminal 113 serves as a negative electrode will be described.

The gasket 114 may be made of an electrically insulating material, e.g., resin or rubber. The gasket 114 may be disposed between the cap plate 112 and the electrode terminal 113. Thus, the gasket 114 may electrically insulate the cap plate 112 from the electrode terminal 113.

The PCM 120 may include a protective circuit (not shown), a first tab 121b, a second tab 121b, and an external terminal 122. The PCM 120 may be spaced apart from the top of the bare cell 110. The PCM 120 may control overall operation of the bare cell 110, including control of charge and discharge.

The protective circuit may include a control device and a switching device. The protective circuit may substantially control overall operation of the secondary battery 100. Thus, the protective circuit may control the charge and discharge of the secondary battery 100. For example, the protective circuit may control the charge and discharge of the secondary battery 100 to prevent the secondary battery 100 from being damaged by overcharge or overdischarge.

The first tab 121a may downwardly extend from a side of the bottom surface or the top surface of the PCM 120. The first tab 121a may be electrically connected to the protective circuit or the external terminal 122. The first tab 121a may be electrically connected to the bare cell 110 by the first lead plate 160. The first tab 121a may electrically connect a positive electrode of the bare cell to the protective circuit.

The second tab 121b may downwardly extend from the opposite side of the bottom surface or the top surface of the PCM 120. The second tab 121b may be electrically connected to the protective circuit. The second tab 121b may be electrically connected to the fuse 130 and the second lead plate 165.

The external terminal 122 may be formed on the top surface of the PCM 120.

The external terminal 122 may electrically connect an external device, i.e., a load (not shown), to the secondary battery 100.

In an implementation, an element 123 may be provided for the protective circuit 120 as a control element and/or switching element of the protective circuit 120. In the case that the element 123 is omitted, the top tape 140 may extend between the protective circuit 120 and the fuse 130.

The fuse 130 may include a main body 131, a first lead 132, and a second lead 133. The fuse 130 may be positioned between the bare cell 110 and the PCM 120 in the vertical direction, e.g., the bare cell 110 may be directly below the fuse 130 and the PCM 120 may be directly above the fuse 130. The fuse 130 may be positioned between the electrode terminal 113 and the second tab 121b in the horizontal direction.

The fuse 130 may be electrically connected to the PCM 120 through the second lead plate 165 and the second tab 121b. The fuse 130 may be electrically connected to the electrode terminal 113. The fuse 130 may electrically connect the bare cell 110 to the PCM 120. When temperature of the bare cell 110 reaches the predetermined level or overcurrent flows through the bare cell 110, the main body 131 may open such that the fuse 130 interrupts the current between the bare cell 110 and the PCM 120.

The main body 131 may be made of may be made of electrically conductive wire that is configured to melt at a predetermined temperature, and may include an insulating resin surrounding the conductive wire. The wire of the main body 131 may be made of, e.g., a metal such as an alloy of lead and tin, or various other materials.

The first lead 132 may be made of an electrically conductive metal plate. The first lead 132 may have one side electrically connected to the electrode terminal 113 and an opposite side electrically connected to the main body 131.

The second lead 133 may be made of an electrically conductive metal plate. The second lead 133 may have one side electrically connected to the main body 131 and an opposite side electrically connected to the second lead plate 165.

The top tape 140 may be made of thermal and electrically insulating material. Further, the top tape 140 may also be made of heat resistant material. In an implementation, the top tape 140 may be made of, or may include, polyethyleneterephthalate (PET). In an implementation, the top tape 140 may be made of, or may include, a material used in an electrically insulating tape such as polyvinyl chloride (PVC).

The top tape 140 may have an approximately plate shape. The top tape 140 may have an area corresponding to a horizontal area of the main body 131, and may cover the main body 131 of the fuse 130. The top tape 140 may be made to cover the entire main body 131 and some or all of the first lead 132 and the second lead 133.

The top tape 140 may be disposed between the PCM 120 and the fuse 130. The top tape 140 may be disposed to cover the entire top surface of the main body 131 of the fuse 130. In an implementation, the top tape 140 may be a monolithic rectangular tape that is configured to cover the entire top surface of the main body 131 and the entire top surfaces of the first lead 132 and the second lead 133. In an implementation, the top tape 140 may be configured such that the top surface thereof may contact the bottom surface of the PCM 120 and the bottom surface thereof may contact the top surface of the main body 131. The top tape 140 may have a height corresponding to a space defined between the PCM 120 and the main body 131. The top tape 140 may fill some or all of the space between the PCM 120 and the main body 131. In an implementation, the top tape 140 may fill a space formed between the PCM 120 and the first and second leads 132 and 133 of the fuse 130.

In an implementation, the top tape 140 may be made of an elastic, compressible material and may have a height, when uncompressed, that is higher than a height of the space between the PCM 120 and the main body 131. The top tape 140 may contact a side surface of the main body 131, and may partially or entirely cover the side surfaces of the main body 131, while filling the space between the PCM 120 and the main body 131, so as to minimize exposure of the side surfaces of the main body 131.

The top tape 140 may prevent hot resin from being introduced into a top space of the main body 131 during the hot melt process of forming the top cover 170. In a case where the top tape 140 contacts directly the bottom surface of the PCM 120 and the top surface of the main body 131, the resin that is introduced into the top space of the main body 131 may be more effectively blocked from the main body 131. In a case where the top tape 140 contacts and covers side surfaces of the main body 131, resin that is introduced around the side surfaces of the main body 131 may be more effectively blocked from the side surfaces of the main body 131. The top tape 140 may prevent the high temperature resin from directly contacting the main body 131. Thus, the main body 131 may be protected against deterioration and damage during the hot melt process.

The bottom tape 150 may be made of, or may include, an electrically insulating material. The bottom tape 150 may be made of, or may include, a heat resistant material. The bottom tape 150 may also be made of, or may include, polyethyleneterephthalate (PET), polyvinyl chloride (PVC), etc. The bottom tape 150 may be generally made of a single material.

The bottom tape 150 may have an approximately plate shape. The bottom tape 150 may have an area corresponding to an area of the fuse 130. The bottom tape 150 may have an area greater than whole area of the main body 131, the first lead 132, and the second lead 133.

The bottom tape 150 may be disposed between the bare cell 110 and the fuse 130. The bottom tape 150 may be configured such that at least one portion of the top surface of the bottom tape 150 generally contacts the bottom surface of the fuse 130. The bottom tape 150 may be made of elastic, compressible material, and may contact and partially or completely cover a side surface of the fuse 130.

The bottom tape 150 may electrically insulate the fuse 130 from the cap plate 112 of the bare cell 110. The bottom tape 150 may also prevent high temperature resin from being introduced into the lower space of the main body 131 during the hot melt process of forming the top cover 170. In a case where the bottom tape 150 directly contacts the top surface of the bare cell 110 and the bottom surface of the main body 131, the resin introduced into the lower space of the main body 131 may be more effectively blocked. In a case where the bottom tape 150 contacts the side surface of the main body 131, the resin introduced into the side space of the main body 131 may also be effectively blocked. The bottom tape 150 may prevent the high temperature resin from directly contacting the main body 131. Thus, the main body 131 may be prevented from being deteriorated or opened during the hot melt process.

A through-hole 151 may pass from the top to the bottom of the bottom tape 150 and may have an area corresponding to that of the main body 131. The through-hole may be formed in a region corresponding to a region where the main body 131 is disposed. The through-hole 151 may expose the bottom surface of the main body 131, which is seated on the bottom tape 150, toward the bare cell 110. Therefore, when the bottom tape 150 has a low thermal conductivity, heat may be more effectively transferred from the bare cell 110 to the main body 131.

In an implementation, the bottom tape 150 may be provided with a heat conducting plate 155. The heat conducting plate 155 may have an area corresponding to that of the through-hole 151. The heat conducting plate 155 may have the same thickness as that of the bottom tape 150. The heat conducting plate 155 may be made of material with thermal conductivity higher than that of air. The heat conducting plate 155 may be inserted into the through-hole 151. The heat conducting plate 155 may be configured such that the bottom surface of the heat conducting plate 155 contacts the top surface of the bare cell 110 and the top surface of the heat conducting plate 155 contacts the main body 131. The heat conducting plate 155 may help transfer heat from the bare cell 110 to the main body 131 more effectively. Thus, the main body 131 may more effectively react to temperature increases of the bare cell 110.

In an implementation, the heat conducting plate 155 may be made by filling the through-hole 151 with thermal conductive adhesive. In a case where the heat conducting plate 155 is made of the thermal conductive adhesive, the fuse 130 may be easily fixed to the bottom tape 150 using the adhesive.

The first lead plate 160 may be made of electrically conductive metal. For example, the first lead plate 160 may be made of metal such as nickel or nickel alloy. The first lead plate 160 may include a first horizontal portion 161 contacting the cap plate 112 and a first vertical portion 162 upwardly extending from the first horizontal portion 161.

The first lead plate 160 may be positioned at a side of the top surface of the cap plate 112 and may be electrically connected to the cap plate 112. The first lead plate 160 may be electrically connected to the first tab 121a. For example, the horizontal portion 161 of the first lead plate 160 may be coupled to the top surface of the cap plate 112 to be electrically connected thereto. The vertical portion 162 of the first lead plate 160 may be electrically connected to the first tab 121a.

The first lead plate 160 may support the PCM 120 and may hold the PCM 120 in a position that is spaced apart from the top surface of the bare cell 110. Thus, an internal space is defined between the bare cell 110 and PCM 120, and the fuse 130 and various devices forming the protective circuit may be mounted in the internal space.

The first horizontal portion 161 of the first lead plate 160 may be coupled to the top surface of the cap plate 112 by, e.g., laser welding or resistance welding. The first vertical portion 162 of the first lead plate 160 may be coupled to the first tab 121a by, e.g., laser welding or resistance welding.

The second lead plate 165 may be made of electrically conductive metal. For example, the second lead plate 165 may be made of metal such as nickel or nickel alloy. The second lead plate 165 may include a second horizontal portion 166 seated on the top of the bottom tape 150 and a second vertical portion 167 upwardly extending from the second horizontal portion 166.

The second lead plate 165 may be electrically connected to the second lead 133 of the fuse 130 on the bottom tape 150. The second lead plate 165 may be electrically connected to the second tab 121b. For example, the second lead plate 165 may be coupled to and electrically connected to the second lead 133, by which the horizontal portion 166 is seated on the top surface of the bottom tape 150. The vertical portion 167 of the second lead plate 165 may be electrically connected to the second tab 121b.

The second lead plate 165 may cooperate with the first lead plate 160 to support the PCM 120 and hold the PCM 120 in a position that is spaced apart from the top surface of the bare cell 110. Thus, an internal space may be defined between the bare cell 110 and the PCM 120, and the fuse 130 and other various devices forming the protective circuit may be mounted in the internal space.

The second horizontal portion 166 of the second lead plate 165 may be coupled to the second lead 133 of the fuse 130 by, e.g., laser welding or resistance welding. The second vertical portion 167 of the second lead plate 165 may be coupled to the second tab 121b by, e.g., laser welding or resistance welding.

The top cover 170 may surround the PCM 120, the fuse 130, the top tape 140, and the bottom tape 150 from the top of the bare cell 110. The top cover 170 may include an external terminal hole 171 to expose the external terminal 122 of the PCM 120.

The top cover 170 may be made by the hot melt process. For example, the top cover 170 may be made by a process in which resin, which is heated to a predetermined temperature, is injected into a region including the space defined between the bare cell 110 and the PCM 120. Thus, the hot resin may be injected into the space, and may be molded to fill the space and form the overall shape of the top cover 170.

The resin injected during the hot melt process may have temperature of about 200 degrees Celsius (° C.). However, the temperature at which the fuse 130 is opened may be lower than the temperature of the hot resin, e.g., the fuse 130 may open at less than 200° C. Thus, if the main body 131 directly contacts the resin, the main body 131 may be damaged. The top tape 140 may prevent the main body 131 of the fuse 130 from being exposed to the high temperature resin during the hot melt process. Thus, the fuse 130 may be prevented from being damaged during the hot melt process.

The bottom cover 180 may include a base 181 and an extension 182. The bottom cover 180 may further include an adhesive tape 185. The bottom cover 180 may be made of electrically insulating resin. The bottom cover 180 may be coupled to the bottom of the bare cell 110 to electrically insulate the bottom of the bare cell 110 from the outside. In an implementation, the bottom cover 180 may be a resin preform. In another implementation, the bottom cover 180 may be made of hot melt resin, e.g., when the top cover 170 is formed.

The base 181 may have a shape and an area corresponding to those of the bottom of the bare cell 110. The base 181 may be coupled to the bottom of the bare cell 110 by, e.g., an adhesive tape.

The extension 182 may extend from the top surface of the base 181 upwardly. The extension 182 may contact sides of the bare cell 110 such that the bottom cover 180 is more securely coupled to the bare cell 110.

The adhesive tape 185 may be made of, or may include, a double-side tape having exposed adhesive layers at opposite faces. The adhesive tape 185 may be adhered to the top surface of the base 181 and the bottom surface of the bare cell 110.

The label 190 may be made of a plate-shaped film with an adhesive layer. The label 190 may be adhered to side surfaces of the top cover 170, the bare cell 110, and the bottom cover 180 to surround the same. The label 190 may help securely couples the top cover 170, the bare cell 110, and the bottom cover 180 with each other.

Hereinafter, secondary batteries according to other embodiments will be described. In the following description, the secondary batteries according to the other embodiments have a top tape different from that of the secondary battery 100 according to the first embodiment described above in connection with FIGS. 1 to 3. Therefore, hereinafter the description will be focused on the top tape. Moreover, the same reference numerals are assigned to the same components of the secondary battery 100 according to the first embodiment as illustrated in FIGS. 1 to 3.

Figure 4:
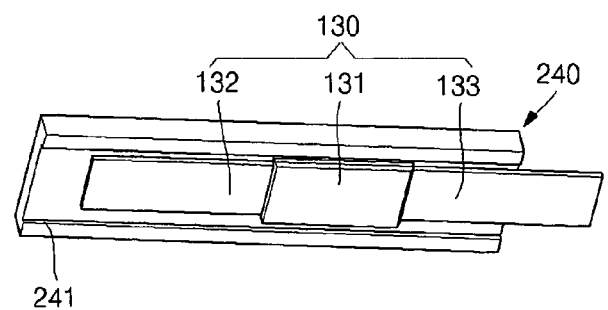
FIG. 4 illustrates a perspective view of a top tape and a fuse of a secondary battery according to a second embodiment.

FIG. 4 illustrates a perspective view of a top tape and a fuse of a secondary battery according to a second embodiment.

Referring to FIG. 4, a top tape 240 of a secondary battery according to the second embodiment may include a device recess 241. The top tape 240 may be otherwise identical to the top tape 140 of the first embodiment.

The device recess 241 may extend from one end to the opposite end of the bottom surface of the top tape 240. Thus, the device recess 241 may be open toward the one end and the opposite end of the top tape 240. The leads of the fuse 130 may extend outwardly through the open ends. The device recess 241 may be larger than a width of the fuse 130. The device recess 241 may have a depth corresponding to the height of the fuse 130. The device recess 241 may be sized to accommodate the fuse 130.

In an implementation, the top tape 240 may be adhered to the bottom tape 150 such that the fuse 130 is accommodated and surrounded in the device recess 241. Thus, the top tape 240 may more effectively prevent the main body 131 of the fuse 130 from contacting the hot resin introduced during the hot melt process. Further, the top tape 240 may effectively block the resin from being introduced to the main body 131 between the top tape 240 and the bottom tape 150 from the front side to the rear side of the secondary battery 100. By preventing the fuse 130 from contacting the resin during the hot melt process, the fuse 130 may be protected against damage.

Figure 5:
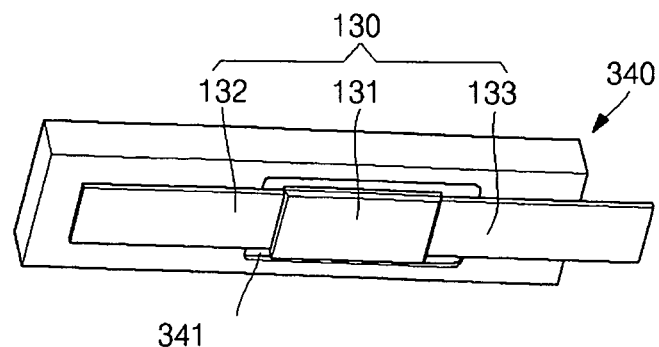
FIG. 5 illustrates a perspective view of a top tape and a fuse of a secondary battery according to a third embodiment.

FIG. 5 illustrates a perspective view of a top tape and a fuse of a secondary battery according to a third embodiment.

Referring to FIG. 5, a top tape 340 of a secondary battery according to the third embodiment may include a device recess 341. The top tape 340 may be identical to the top tape 140 according to the first embodiment described above in connection with FIGS. 1 to 3, except for the device recess 341.

The device recess 341 may be defined in an approximately central region of the bottom surface of the top tape 340. The device recess 341 may not be open toward sides of the top tape 340. The device recess 341 may have an area larger than that of the main body 131. The device recess 341 may have a depth corresponding to the height of the main body 131. The device recess 341 may be sized to accommodate the main body 131. The leads of the fuse 130 may extend beyond the recess. For example, the first lead 132 and the second lead 133 of the fuse 130 may extend beyond the recess to contact the bottom surface of the top tape 340.

The top tape 340 may be adhered to the bottom tape 150, with the main body 131 being accommodated in the device recess 341. Thus, the top tape 340 may effectively prevent the main body 131 from contacting the hot resin introduced during the hot melt process. Further, the top tape 340 may effectively block the resin from being introduced to the main body 131 from the front side, the rear side, and both lateral sides.

By preventing the fuse 130 from contacting the resin during the hot melt process, the fuse 130 may be protected against damage.

Figure 6:
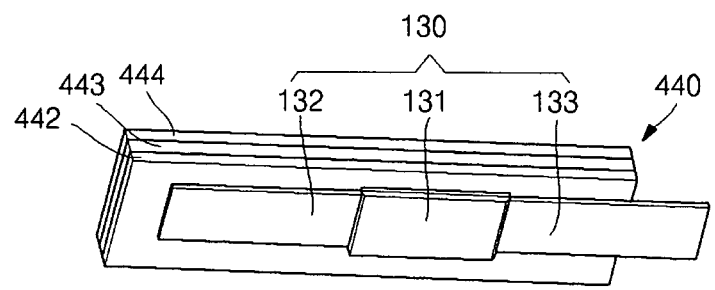
FIG. 6 illustrates a perspective view of a top tape and a fuse of a secondary battery according to a fourth embodiment.

FIG. 6 illustrates a perspective view of a top tape and a fuse of a secondary battery according to a fourth embodiment.

Referring to FIG. 6, a top tape 440 of a secondary battery according to the fourth embodiment may include a first layer 442, a second layer 443, and a third layer 444. The top tape 440 may be configured such that the first and third layers 442 and 444 have heat resistance superior than that of the second layer 443, i.e. the first and third layers 442 and 444 may be more heat tolerant than the second layer 443. Thus, the second layer 443 of the top tape 440 may be protected against damage from heat of the resin during the hot melt process by the first layer 442 and the third layer 444. The layering of the top tape 440 may provide for more effective interruption of heat transfer from the resin to the fuse 130 during the hot melt process through the use of a highly thermally insulating second layer 443.

The first layer 442 may form the bottom of the top tape 440 and may be adhered to the top surface of the fuse 130. The third layer 444 may form the top of the top tape 440 and may contact the resin during the hot melt process.

The first and third layers 442 and 444 may be made of material having heat resistance, i.e., heat tolerance, superior than that of the second layer 443. For example, the first and third layers 442 and 444 may be made of polyethyleneterephthalate (PET) with excellent heat tolerance. Thus, in the top tape 440, the first and third layers 442 and 444 contacting the resin may have high heat tolerance and damage caused by heat of the resin may be minimized or eliminated.

The second layer 443 may be made of a material that is highly thermally insulating, e.g., a foam tape having fine pores. The second layer 443 may absorb and/or block the heat of the resin as a result of the fine pores. The second layer 443 may exhibit heat insulation properties superior to those of the first layer 442 and third layer 444. Thus, the top tape 440 may better protect the main body 131 of fuse 130 from hot melt temperatures as a result of using the second layer 443 between the first layer 442 and the third layer 444.

Figure 7:
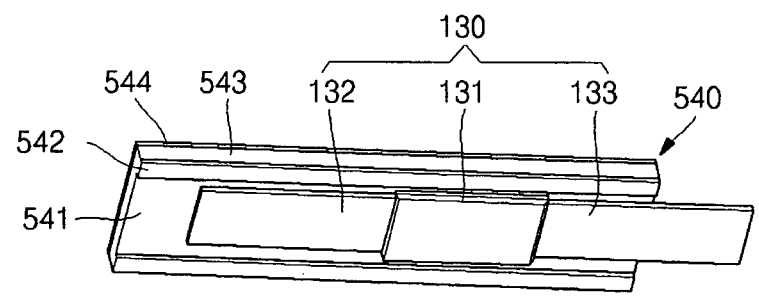
FIG. 7 illustrates a perspective view of a top tape and a fuse of a secondary battery according to a fifth embodiment.

FIG. 7 illustrates a perspective view of a top tape and a fuse of a secondary battery according to a fifth embodiment.

Referring to FIG. 7, a top tape 540 of a secondary battery according to the fifth embodiment may include a device recess 541, a first layer 542, a second layer 543, and a third layer 544. Thus, the top tape 540 may include the device recess 541, in which the fuse 130 is seated, and may have the multi-layered structure described above in connection with the fourth embodiment. The top tape 540 may entirely accommodate the fuse 130 within the device recess 541. The top tape 540 may be protected from damage from heat of the resin during the hot melt process by using the multi-layered structure, and may effectively block heat transfer from the hot resin to the fuse 130 during the hot melt process as a result of the combination of the recessed structure and multi-layer structure.

The device recess 541 may be identical or similar to the device recess 241 of the second embodiment described above in connection with FIG. 4. In an implementation, the device recess 541 may be formed throughout the first layer 542, i.e., the recess may penetrate the first layer 542. In an implementation, the recess may partially or fully penetrate the second layer 543, such that the device recess 541 is formed in the first and second layers 542 and 543. In an implementation, the recess may not penetrate the third layer 544, such that the third layer 544 covers at least the main body 131 of the fuse 130.

The first, second, and third layers 542, 543, and 544 may be identical or similar to the first, second, and third layers 442, 443, and 444 of the top tape 440 of the fourth embodiment described above in connection with FIG. 6. The first and third layers 542 and 544 may have heat tolerance superior than that of the second layer 543, while the second layer 543 may have heat insulating properties that are superior to those of the first and third layers 542 and 544.

Figure 8:
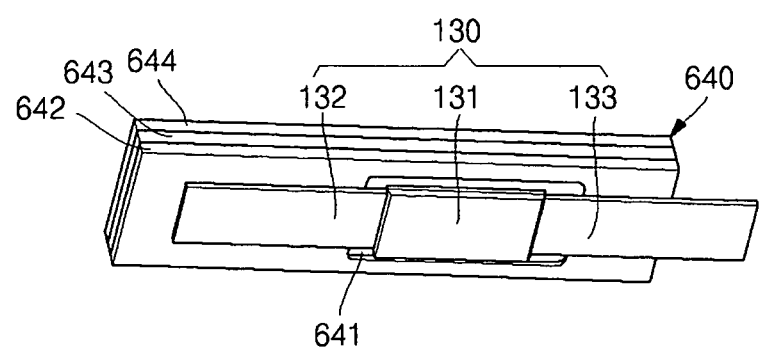
FIG. 8 illustrates a perspective view of a top tape and a fuse of a secondary battery according to a sixth embodiment.

FIG. 8 illustrates a perspective view of a top tape and a fuse of a secondary battery according to a sixth embodiment.

Referring to FIG. 8, a top tape 640 may include a device recess 641, a first layer 642, a second layer 643, and a third layer 644. The top tape 640 may include the device recess in which the main body 131 of the fuse 130 is seated, such that the top tape 640 accommodates the main body 131 of the fuse 130 in the device recess 641 completely, while leads of the fuse 130 may extend laterally beyond the recess. Thus, the top tape 640 may effectively block heat transfer from the hot resin to the main body 131 of the fuse 130 during the hot melt process.

The device recess 641 may be identical or similar to the device recess 341 of the third embodiment described above in connection with FIG. 5. Thus, further details of the device recess 641 need not be repeated. As illustrated in FIG. 8, the device recess 641 may be formed in the first layer 642, or in the first and second layers 642 and 643. Forming the device recess in the first layer 642 alone may simplify the manufacture of the top tape 640, as an opening may be formed only in the first layer 642, and not in the second or third layers 643 and 644. Further, the closed ends of the device recess 641 may be effective to block the flow of hot resin from the main body 131 of the fuse 130.

The first to third layers 642, 643, and 644 may be identical or similar to the first to third layers 442, 443, and 444 which are formed in the top tape 440 of the fourth embodiment described above in connection with FIG. 6. The first and third layers 642 and 644 may have heat tolerance superior than that of the second layer 643, while the second layer may have thermally insulating properties that are superior to those of the first and third layers 642 and 644.

Figure 9:
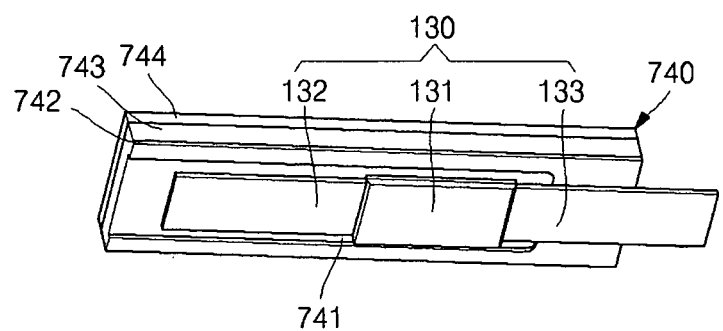
FIG. 9 illustrates a perspective view of a top tape and a fuse of a secondary battery according to a seventh embodiment.

FIG. 9 illustrates a perspective view of a top tape and a fuse of a secondary battery according to a seventh embodiment.

Referring to FIG. 9, a top tape 740 of a secondary battery according to the seventh embodiment may include a device recess 741, a first layer 742, a second layer 743, and a third layer 744. The top tape 740 may include the device recess 741 in which at least a portion of the fuse 130 is seated. For example, the top tape 740 may accommodate the main body 131 and the first lead 132 of the fuse 130 in the device recess 741.

The device recess 741 is similar to the device recess 641 of the sixth embodiment described above in connection with FIG. 8, except that the device recess 741 may have a shape in which only one of the two ends of the top tape 740 is opened. For example, the device recess 741 may have one open side, through which the first lead 132 of the fuse 130 extends. Thus, in the top tape 740, a region in which the first lead 132 is coupled with the electrode terminal 113 may be recessed to accommodate the first lead 132 and a contact thereof with the electrode terminal 113. The top tape 740 may effectively block the hot resin from being introduced into the opposite side, i.e., the side of the second lead 133, while at the same time having a structure that blocks flow of the hot resin to the electrode terminal 113. In this regard, the hot resin used to form the top cover may be injected at the right side of the secondary battery, i.e., on the side of the second lead 133. Thus, it may be more important to provide additional protection for the main body 131 at the side of the second lead 133. Further, referring again to FIG. 2, the terminal 133 may be located directly below the top tape 740 on the first lead 132 side of the recess 741. Thus, the side of the recess 741 that is proximate to the first lead 132 may be open. The device recess 741 may be formed to penetrate the first layer 742, or may be formed in both the first layer 742 and the second layer 743.

The first, second, and third layers 742, 743, and 744 may be identical or similar to the first, second, and third layers 642, 643, and 644 of the top tape 640 of the sixth embodiment described above in connection with FIG. 8. The first and third layers 742 and 744 may have heat tolerance superior than that of the second layer 743, while the second layer 743 may have thermally insulating properties that are superior to those of the first and third layers 742 and 744.

As described above, a secondary battery according to embodiments may include a thermal fuse, the fuse being prevented from contacting hot resin so as to prevent the fuse from being damaged during a hot melt process used to form a top cover. Thus, damage to the fuse during the manufacturing process, e.g., as a result of the fused being exposed to excessive temperatures, may be reduced or eliminated so as to prevent the occurrence of defects in the finished battery. Contact between the fuse and the hot resin may be prevented during the hot melt process used to form the top cover, such that heat transfer from the hot resin to the fuse is minimized. Thus, the fuse may be protected against damage during the hot melt process.

Exemplary embodiments have been disclosed herein, and although specific terms are employed, they are used and are to be interpreted in a generic and descriptive sense only and not for purpose of limitation. For example, while embodiments have been described in connection with a secondary battery, they may be applicable to a variety of batteries, and while embodiments have been described in connection with a heat-sensitive thermal fuse, they may be applicable to a variety of heat-sensitive elements or devices. Accordingly, it will be understood by those of ordinary skill in the art that various changes in form and details may be made without departing from the spirit and scope of the present invention as set forth in the following claims.

What is claimed is:

1. A battery, comprising:
an external terminal;
a thermal fuse including a metallic main body and a plurality of leads connected to the metallic main body;
a bare cell;
an electrode assembly disposed within the bare cell and electrically coupled to the external terminal via the thermal fuse, such that the thermal fuse electrically disconnects the electrode assembly from the external terminal when a temperature of the battery reaches a predetermined value;
a top cover;
a protective circuit module within the top cover and on the bare cell; and
a thermally insulating top sheet disposed on the thermal fuse, between the thermal fuse and the protective circuit module, the top sheet having a recess configured to receive at least the metallic main body of the thermal fuse therein, the recess being a hole extending into the top sheet, such that the top sheet covers the top surface and at least parts of the side surfaces of the metallic main body.

2. The battery as claimed in claim 1, wherein:
the top cover includes a mold material, and
the mold material is flowable during manufacture of a battery cover so as to conform to the protective circuit module.

3. The battery as claimed in claim 1, wherein:
the metallic main body is seated within the hole.

4. The battery as claimed in claim 1, wherein:
the plurality of leads of the thermal fuse include a first lead extending from a first end of the metallic main body, and a second lead extending from a second end of the metallic main body, and
the hole is a channel shaped hole extending into the top sheet, the channel shaped hole being configured to house at least parts of side surfaces of each of the metallic main body, the first lead, and the second lead therein.

5. The battery as claimed in claim 1, wherein:
the plurality of leads of the thermal fuse include a first lead extending from a first end of the metallic main body, and a second lead extending from a second end of the metallic main body,
the hole is a box shaped hole extending into the top sheet, the box shaped hole being configured to house at least parts of side surfaces of the metallic main body therein, and
the first lead and the second lead extend along the top sheet outside the periphery of the recess.

6. The battery as claimed in claim 1, wherein the top sheet includes at least three layers, including:
a center layer providing a first degree of thermal insulation, and
a top layer and a bottom layer sandwiching the center layer, the top and bottom layers having a second degree of thermal insulation less than that of the center layer, and having a heat tolerance that is greater than that of the center layer.

7. The battery as claimed in claim 6, wherein the hole does not extend completely through the top layer, such that at least a partial thickness of the top layer covers the top surface of the thermal fuse.

8. The battery as claimed in claim 7, wherein the hole does not extend completely through the center layer, such that at least a partial thickness of the center layer covers the top surface of the thermal fuse.

9. The battery as claimed in claim 6, wherein:
the hole extends completely through the bottom layer such that a bottom surface of the hole is defined by the center layer or the top layer and such that portions of side surfaces of the hole are defined by the bottom layer, and
the metallic main body of the thermal fuse is seated within the hole and the bottom surface of the hole covers the top surface of the metallic main body.

10. The battery as claimed in claim 9, wherein:
the plurality of leads of the thermal fuse include a first lead extending from a first end of the metallic main body, and a second lead extending from a second end of the metallic main body,
the hole is formed at least in part by a box shaped opening in the bottom layer, the box shaped opening being configured to receive the main body, and
the first lead and the second lead extend along the bottom layer outside the periphery of the recess.

11. The battery as claimed in claim 10, wherein sides of the metallic main body are at least partially overlapped in a vertical direction by sidewalls of the hole.

12. The battery as claimed in claim 1, wherein:
the plurality of leads of the thermal fuse include a first lead extending from a first end of the main body, and a second lead extending from a second end of the main body,
the hole has a partial channel shape configured to receive the metallic main body and the first lead,
the second lead extends beyond the periphery of the hole, and
the first lead is electrically coupled to an electrode terminal of the electrode assembly, the partial channel shape covering the first lead and the electrode terminal.

13. The battery as claimed in claim 1, further comprising a thermally insulating bottom sheet disposed under the thermal fuse, between the thermal fuse and the bare cell, wherein:
the top sheet and bottom sheet together cover a top surface, at least a portion of a bottom surface, and side surfaces of the thermal fuse, such that the thermal fuse is thermally insulated from a mold material used to form the top cover.

14. The battery as claimed in claim 13, wherein:
the plurality of leads of the thermal fuse include a first lead extending from a first end of the metallic main body, and a second lead extending from a second end of the metallic main body,
the bottom sheet has an opening therethrough that corresponds to the main body, and
the main body is in thermal communication with the bare cell via the opening.

15. The battery as claimed in claim 14, wherein the bottom sheet electrically isolates the thermal fuse from an adjacent surface of the bare cell, and
a thermally conductive material is disposed in the opening so as to provide a thermal coupling between the thermal fuse and the adjacent surface.

16. A battery, comprising:
an external terminal;
a thermal fuse including a metallic main body and a plurality of leads connected to the metallic main body;
a bare cell;
an electrode assembly disposed within the bare cell and electrically coupled to the external terminal via the thermal fuse, such that the thermal fuse electrically disconnects the electrode assembly from the external terminal when a temperature of the battery reaches a predetermined value;
a top cover;
a protective circuit module within the top cover and on the bare cell; and
a thermally insulating top sheet disposed on the thermal fuse, between the thermal fuse and the protective circuit module, wherein:
the top sheet covers a top surface of the metallic main body of the thermal fuse, such that the top surface of the metallic main body is thermally insulated, and
the top sheet includes at least three layers, including:
a center layer providing a first degree of thermal insulation, and
a top layer and a bottom layer sandwiching the center layer, the top and bottom layers having a second degree of thermal insulation less than that of the center layer, and having a heat tolerance that is greater than that of the center layer
at least the bottom layer includes a recess that is configured to receive at least the metallic main body of the thermal fuse therein, the recess being a hole that does not extend completely through the top layer, such that at least a partial thickness of the top layer covers a top surface of the main body.

17. The battery as claimed in claim 16, wherein:
the plurality of leads of the thermal fuse include a first lead extending from a first end of the main body, and a second lead extending from a second end of the main body,
the hole is at least in part a box shaped opening that penetrates through the bottom layer, the box shaped opening being configured to receive the metallic main body therein, sides of the metallic main body being at least partially overlapped in a vertical direction by sidewalls of the recess, and
the first lead and the second lead extend along the bottom layer of top sheet outside the periphery of the recess.

18. The battery as claimed in claim 16, wherein:
the top cover includes a mold material, and
the mold material is flowable during manufacture of a battery cover so as to conform to the protective circuit module.

19. A battery, comprising:
an external terminal;
a thermal fuse including a metallic main body and a plurality of leads connected to the metallic main body;
a bare cell;
an electrode assembly disposed within the bare cell and electrically coupled to the external terminal via the thermal fuse, such that the thermal fuse electrically disconnects the electrode assembly from the external terminal when a temperature of the battery reaches a predetermined value;
a top cover;
a protective circuit module within the top cover and on the bare cell;
a thermally insulating top sheet disposed on the thermal fuse, between the thermal fuse and the protective circuit module, the top sheet includes a recess that is configured to receive at least the metallic main body of the thermal fuse therein, the recess being a hole extending into the top sheet; and
a thermally insulating bottom sheet disposed under the thermal fuse, between the thermal fuse and the bare cell, wherein:
the top sheet and bottom sheet together cover a top surface, at least a portion of a bottom surface, and side surfaces of the metallic main body of the thermal fuse, such that the metallic main body is thermally insulated from a mold material of a battery cover.

20. The battery as claimed in claim 19, wherein:
the top cover includes the mold material, and
the mold material is flowable during manufacture of the battery cover so as to conform to the protective circuit module.

* * * * *